E. M. MOUSER.
COMBINATION COOKER AND WATER HEATER.
APPLICATION FILED MAR. 29, 1918.

1,318,686.  Patented Oct. 14, 1919.

INVENTOR
Eugene M. Mouser
BY
ATTORNEYS

UNITED STATES PATENT OFFICE.

EUGENE M. MOUSER, OF INDIANAPOLIS, INDIANA.

COMBINATION COOKER AND WATER-HEATER.

1,318,686.     Specification of Letters Patent.     Patented Oct. 14, 1919.

Application filed March 29, 1918. Serial No. 225,489.

*To all whom it may concern:*

Be it known that I, EUGENE M. MOUSER, a citizen of the United States, residing at Indianapolis, Marion county, and State of Indiana, have invented and discovered certain new and useful Improvements in Combination Cookers and Water-Heaters, of which the following is a specification.

My invention relates to combined cookers and water heaters, and the objects of the invention are to provide a utensil of the class described which is particularly adaptable for the preparation and service of food and hot water on trains, especially in connection with the transportation of troops, in which service it is necessary to feed large bodies of men; to provide a construction whereby means for heating water and receptacles for cooking food from the heat derived from the heated water may be conveniently mounted within a body of compact construction and of such form that will prevent the splashing of the contents of the water heater and food receptacles over the top of the same and which body shall also be of such form as to be capable of readily fitting a portable stove or furnace constituting the heating member; to provide means whereby the correct centering of the food receptacles within the said body and the secure retention of the same in place against the effect of the jars, shocks and swaying action incident to transportation in trains, are insured; to provide means whereby the exhaust steam from the water heater may be utilized as an auxiliary heating medium capable of application to several of the food receptacles; to provide means whereby the space below the furnace or stove may be utilized for the cooking or heating of an additional food supply, and to provide means to enable the ashes to be removed conveniently without danger of mixture of the same with the protective body of material below the furnace or the deposit of the ashes upon the surrounding surface, and to provide a combined furnace and cooking and heating utensil the various units of which may be readily assembled and disassembled for the purpose of convenient transportation.

With these objects in view my invention is embodied in preferable form in the construction, arrangement and combination hereinafter described and illustrated in the accompanying drawings.

Figure 1:
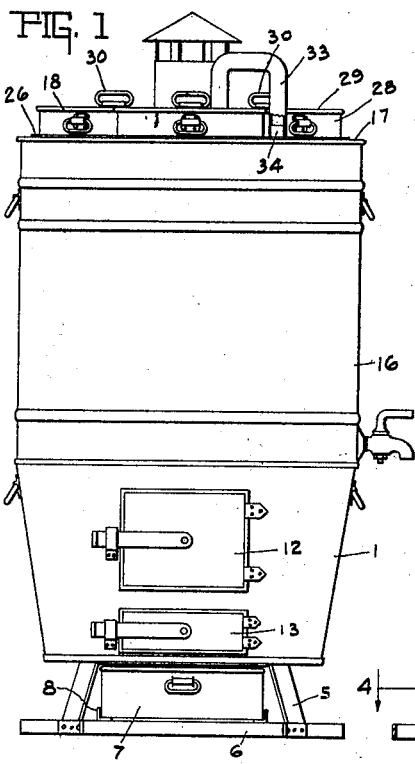
Figure 2:
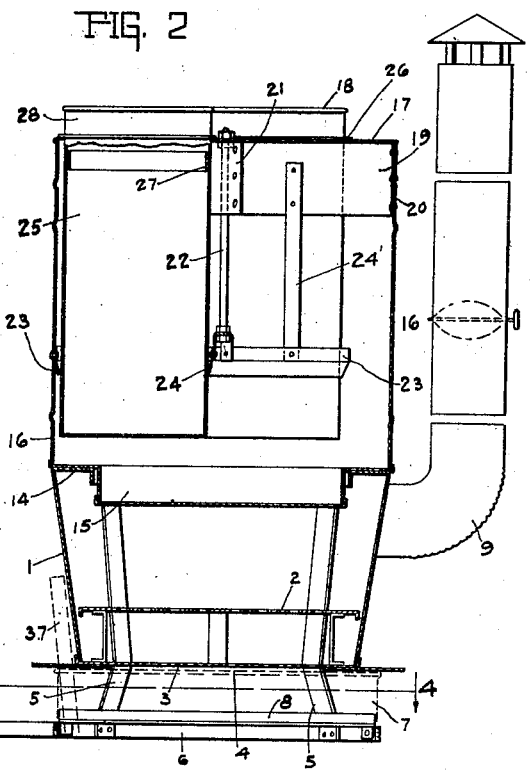
Figure 3:
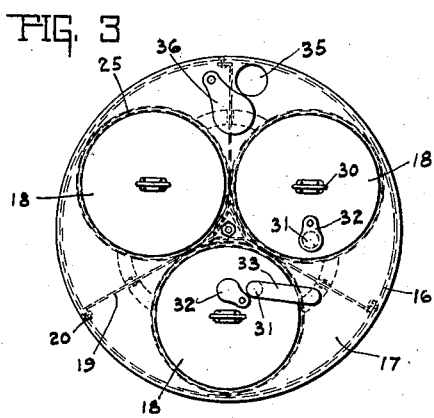
Figure 4:
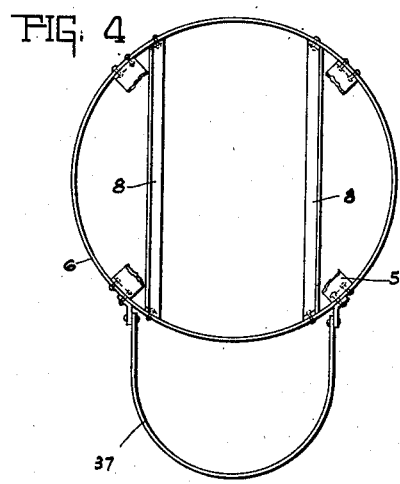
Figure 5:
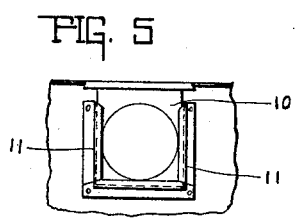

In these drawings, Figure 1 is a front view in elevation of the complete apparatus; Fig. 2, a vertical sectional view at right angles to Fig. 1 with part of one of the food receptacles broken away; Fig. 3, a top plan view, and Fig. 4, a horizontal section on the line 4—4 of Fig. 2, showing the movable protecting hearth swung down into horizontal position, and Fig. 5, a detail of pipe and furnace connection.

Referring to the drawings, 1 indicates a furnace consisting of a sheet metal body in the form of a truncated cone and having a grate 2 and a bottom 3 preferably having inclosed therein a protecting pad or cover of asbestos, 4, whereby the surface of the support on which the furnace rests is protected from the heat of the fuel. The furnace is provided with legs 5 depending from the bottom of the furnace and inclined outwardly and secured at their lower ends to a base ring 6 which ring constitutes the support for the apparatus and the faces of which extend in vertical planes so as to thereby constitute an engaging and retaining member for a mass of material, such as gravel which is adapted not only to protect the surface of the body on which the device may be placed, but also to serve as a heat absorbing and retaining medium so as to derive heat from the bottom of the furnace and serve as a heating bed on which may be placed a suitable sliding tray 7, adapted to contain food. This tray is adapted to be slidingly supported upon rails 8 extending across the ring and secured thereto. A sectional smoke and gas pipe 9 connects with the upper part of the smoke chamber of the furnace, and that section thereof which is adjacent the body of the furnace is provided with a vertical slip plate 10 adapted to engage offset retaining flanges 11 on the outer face of the body of the furnace. 12 is a fuel door for the furnace and 13 a draft door therefor. The upper end of the furnace is provided with an annular flange 14 adapted to cover the smoke chamber and is provided with a depending lip within which fits the offset pit bottom 15 of the boiler or water heater 16 which rests upon the flange 14 and is locked against lateral displacement by the interfitting of the pit bottom within the body of the furnace.

This water heater or boiler consists of a cylindrical sheet metal body open at the top to permit the introduction of water therein and provided with a drawing faucet whereby hot water may be drawn from the heater when desired. The top 17 of the heater is provided with a plurality of circular openings 18, preferably three in number. Between the circles of these openings are adapted to extend vertical dividing and bracing plates 19 bearing against the lower surface of the top 17 and having angle flanges 20 which are riveted to the wall of the heater at the outer ends of the plates and having similar inner flanges 21 which are riveted together centrally of the heater. A hanger rod 22 is bolted or riveted at its upper end to the top of the water container and extends downwardly through the body of the latter and at its lower end is connected to a series of three centering and guiding rings 23, the lower portions of which are formed into inclined or inwardly flaring bearing flanges 24. Metal straps 24' are secured to the plates 19 and connected at their lower ends to the rings 23 and serve as additional braces and supports for said rings and also as vertical guiding and centering members for the receptacles.

25 indicates a series of food receiving and cooking receptacles consisting preferably of sheet metal cans each provided with an exterior flange 26 adapted to rest upon the top of the heater. These cans are adapted to be inserted through the openings 18 in the top of the heater and held within the guiding and retaining nests formed by the radial brace plates 19 and the annular centering and guide members 23. As the receptacles are placed in the heater and pushed down the lower part thereof will bear against the flaring flange 24 of the annular guide rings thus insuring the correct vertical positioning of the receptacles within the heater. These flaring flanges also serve by their spring pressure against the sides of the receptacles to retain the latter firmly in upright position against shocks or jars after they have been inserted. The upper bracing and partition plates 19 also have contact against a part of the upper surfaces of the receptacles and aid in retaining them in correct position as well as in bracing the wall of the heater.

Each cooking receptacle is provided at its upper edge with a downwardly projecting splash breaking flange 27 adapted to interrupt the upward movement of the liquid contents in any swaying movement of the apparatus and thus prevent the liquid from being splashed over the top of the receptacles. Each receptacle is also provided with a vertical flange 28 projecting above the surface of the cover of the heater with which flange is adapted to engage a removable slip cover 29 having a handle 30. The covers of two of the receptacles are further provided with openings 31 having pivoted closures 32 and through either of which openings is adapted to be projected the end of a slip pipe section 33 constituting a steam conveying member and the other end of which is adapted to be slipped over the end of a short pipe section 34 leading from the top of the heater and communicating with the interior thereof. By this arrangement the steam generated in the upper part of the heater may be conducted to either of the two compartments for the purpose of increasing the heat therein and thus more fully utilizing the steam and quickening the cooking action. 35 is a draining opening in the top of the water container which is adapted to be covered by a pivoted closure 36.

Pivoted to the supporting ring of the furnace opposite the fuel door is a swinging hearth member 37 adapted to protect the surrounding surface of the base on which the furnace may be mounted when the ashes are being removed.

In the use of the apparatus the furnace or stove is set up and the heater body placed thereon and the food receptacles inserted within their seats, in such insertion the annular guide member serving to center the receptacles and retain them in place after insertion. The heater body is then surrounded with water and the fuel which is preferably charcoal or coke is lighted to heat the water. The plurality of cooking receptacles enables different kinds of food to be separately cooked at the same time and after such food has been placed in the compartments it may be thoroughly cooked to the desired extent through the heat imparted from the surrounding body of water in the heater body while at the same time hot water may be drawn from the heater through the faucet, when desired.

Having thus described my invention, what I claim is:

1. In a device of the class described, in combination with a furnace, a combined water heater and cooking member adapted to be removably mounted upon said furnace for heating thereby, said member comprising a water container and removable cooking receptacles suspended within the water container, and means fixed to the container for centering and retaining the cooking receptacles grouped in radial position about the axis as they are inserted within the container.

2. In a device of the class described, in combination with a furnace, a combination water heater and cooker comprising a water containing body, a cooking receptacle insertible within said body, guiding and centering means for said receptacle within said body, and means for fixedly suspending said guiding and centering means from the top wall of the container body and grouped about its vertical axis.

3. In a device of the class described, in combination with a furnace, a combined water heater and cooking apparatus comprising a hollow water container, a cooking receptacle insertible within said container through the top thereof, an annular guiding and retaining member for said receptacle fixed in the lower part of said container body and adapted to have an annular bearing pressure against the receptacle as the latter is inserted, and a hanger suspended from the top wall of the container body to which said annular centering and retaining member is secured.

4. In a device of the class described, in combination with a furnace, a combined water heater, a cooking apparatus removably mounted on said furnace and having a water heating container, a plurality of cooking receptacles adapted to be mounted within said container, an annular centering and retaining ring for each receptacle and a common central hanger for said rings fixed from the top wall of the said container and depending therefrom.

5. In a device of the class described, in combination with a furnace, a combined water heating and cooking apparatus having a water container and cooking receptacle adapted to be mounted within said container and a centering and retaining member for said receptacle mounted adjacent the lower part of the container within the latter and having an inwardly tapered portion adapted for bearing against the surface of the receptacle as the latter is inserted into place.

6. In a device of the class described, in combination with a furnace, a combined water heating and cooking apparatus removably mounted thereon, and comprising a water heater, a series of removable cooking receptacles adapted to be mounted within said container, a series of dividing and bracing plates in the upper part of said container extending between the receptacle spaces, a central hanger suspended from the top of the container, and annular centering and retaining rings adapted to receive and bear against said receptacles and located adjacent the lower part of said container within the latter, said rings having vertical portions and inwardly inclined flanges extending from the lower edges of the vertical portions and adapted to press against the sides of the receptacles as the same are inserted.

7. In a device of the class described, in combination with a furnace, a combined water heating and cooking apparatus comprising a water container, a plurality of food cooking receptacles mounted within said container, covers for said receptacles, steam openings through said covers and through the top of the container and a detachable pipe adapted to be adjusted to connect the steam space of said container with either of the openings through said receptacle covers, and means for closing either of said cover openings when the pipe is not connected thereto.

8. In a cooking and water heating apparatus, in combination with a furnace, a water container mounted upon said furnace, a supporting member for said furnace spaced from the bottom thereof, and a sliding food tray inserted between said support and said bottom, and means carried by the furnace structure for supporting said tray.

9. In a device of the class described the combination with a furnace, a combined water heating and cooking apparatus removably mounted thereon and comprising a water container, a series of removable cooking receptacles adapted to be mounted within said container, a series of radially extending, dividing and bracing plates fixedly secured in the upper part of said container and defining the receptacle spaces, and a receptacle hanger suspended from the plates and proportioned to position and support the cooking receptacles.

In witness whereof, I have hereunto set my hand and seal at Indianapolis this 20th day of March, A. D. nineteen hundred and eighteen.

EUGENE M. MOUSER. [L. S.]

Witnesses:
H. P. DOOLITTLE,
M. L. SHULER.